UNITED STATES PATENT OFFICE.

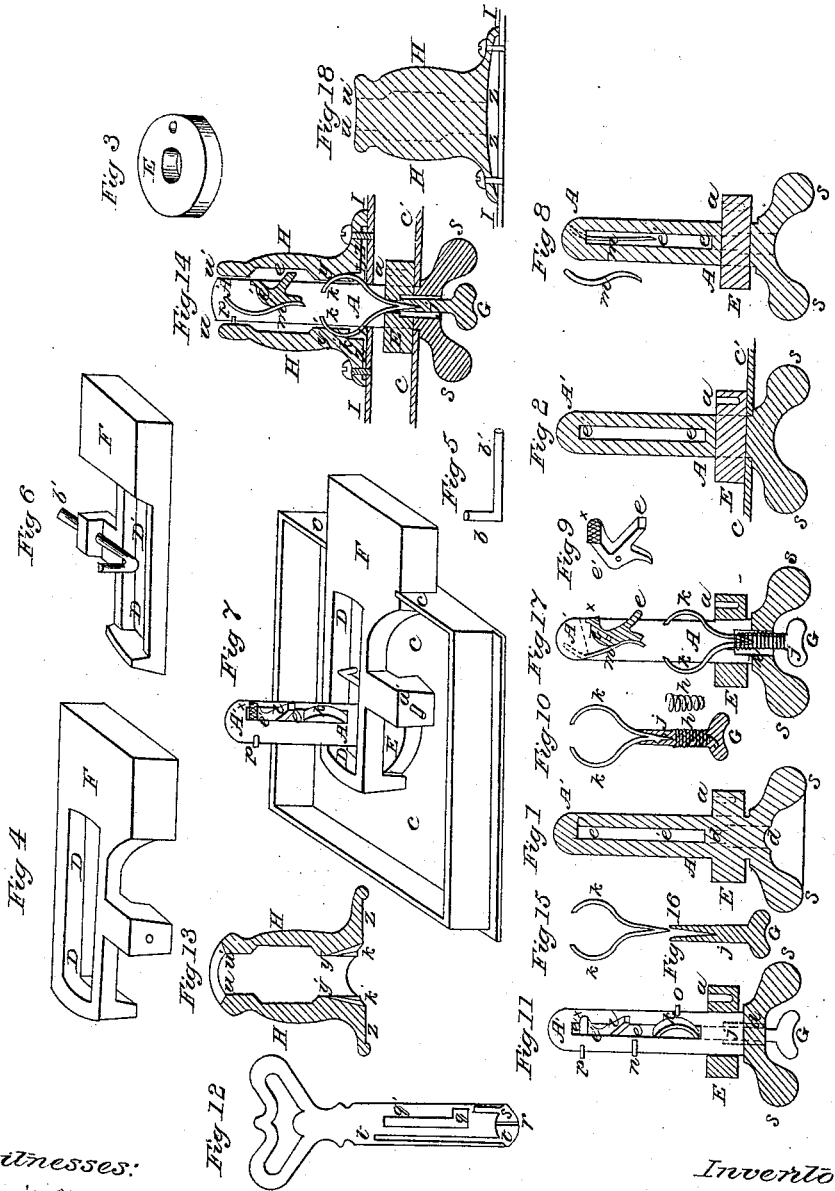

E. OTIS FRINK AND CURRAN E. McDONALD, OF INDIANAPOLIS, INDIANA.

IMPROVED LOCK AND BOLT.

Specification forming part of Letters Patent No. 39,223, dated July 14, 1863.

*To all whom it may concern:*

Be it known that we, E. OTIS FRINK and CURRAN E. McDONALD, of Indianapolis, county of Marion, State of Indiana, have invented a new and Improved Lock; and we do hereby declare the following to be a full and exact description thereof, reference being had to the accompanying drawings, and to the letters and figures of reference marked thereon.

The nature of our invention consists in the form of which we make our bolt and key, the manner in which we operate the same, and the devices therefor.

In order to enable others skilled in the art to make and use our invention, we proceed to describe its construction and operation.

We make our lock of iron or brass, or any other metal suitable for that purpose. Through the hole B of the face-plate C C' is passed the shank A A' of the knob S S, as represented at No. 2 of the said drawings. The annular plate E of No. 3 of the said drawings is then driven over the said shank A A' in the manner represented at said No. 2, so that the said knob S S and its said shank A A', carrying with them the said annular plate E, may revolve freely in the said hole B. In the said annular plate E is drilled a hole, *a*. In the bolt F of No. 4 of the said drawings, is also drilled a hole, *a'* of the same size. In the said hole *a'*, of the said bolt, is placed the arm *b'* of the bent wire *b b'* of No. 5 of the said drawings in the manner represented at No. 6 of the said drawings. The said bolt is then laid on the said annular plate E in such a position that the said shank A A' passes through the slot D D' of the said bolt, and the arm *b'* of the said bent wire *b b'* resting, so as aforesaid, in the hole *a'* of the said bolt F, and the said arm *b* of the said wire *b b'* at the same time resting in the hole *a* of the said annular plate E, the same being as represented at No. 7 of the said drawings. When the said knob S S is revolved, an eccentric motion is produced by the said annular plate, bent wire, and bolt the same being constructed and applied, so as aforesaid, the bolt is moved forward and backward thereby, the said shank A A' and the slot *o o* of the edge-plate holding the said bolt in its proper direction while the same is moving. When the annular plate in its revolution has carried the said hole *a* to a point coincident with the center of the said slot D D', it will be upon the dead center of its motion and the bolt will be locked in and out respectively thereby.

In order to operate a key with the said lock, the shank A A' aforesaid passes through the hole L L of the parting-plate I I, as represented at No. 14 of the said drawings. Over this is placed the escutcheon-tube 13 in manner and form as represented at said No. 14. The spring *k k* of No. 15 of the said drawings resting in the slots *k' k'* of the said escutcheon-tube in such a manner as to hold the bolt open and shut respectively as represented at the said No. 14, when the tubular key No. 12 of the said drawings is pushed down between the shank A A' aforesaid, and the said escutcheon-tube through the narrow annular space represented at *n n'* of the said No. 14, it will close the spring *k k* out of the said slots *k' k'* and the said bolt will then be free to move.

In order to prevent any tube of the proper size from being used as a key, the tumbler *l l* of No. 9 of the said drawings is placed in the proper position in the said shank A' A so that the point *l* of said tumbler shall protrude a little beyond the surface of the said shank into the chamber H H of the said escutcheon-tube. The said point *l* is held in its place by a spring, *m*, as represented in the said No. 14. The said tumbler is provided with a head represented by *x* of the said No. 9, on which is cut a series of teeth similar to those of a file. When the key has entered to the said escutcheon-tube in manner and form as aforesaid, it first comes into contact with the said arm *l* of the said tumbler *l l'*, and the said tumbler being hung on a pivot, and the said arm *l* being thrown backward by the said key, the file-faced head *x* will be pushed through the slot *q q'* of the said key at the enlargement marked by *q'*. The neck of the said tumbler slipping along the slot *q q'* toward *q'* allows the key to close the said spring *k k* in manner and form as aforesaid. On the said shank is placed a pin, *p*, of the said No. 14, which, sliding in the slot *t t'* of the said key, always holds the same in the proper position. When the said springs *k k* are closed out of the slots *k' k'* so as aforesaid, the said bolt will be free to move by turning the key, and the same is therefore readily locked and unlocked.

In order to prevent the said lock from being blown up with gunpowder, a slot, $z\ z$, of the said No. 14, intervenes between the said escutcheon-tube and the parting-plate I I, as represented by $z\ z$ of the said No. 14. Any effort to convey powder down to the said lock will only carry it to the said slot $z\ z$, where it will drop out. If any small amount of powder should remain in the chamber H H of the said escutcheon-tube when the same is exploded, it will have so much vent at the said slot $z\ z$ and the said annular space $u\ u'$ that it will do no damage.

In order that the said lock may be readily opened from the inside of the door, the cylindrical slide represented by No. 16 of the said drawings, with the spring $k\ k$ attached, in manner and form as represented by No. 10 of the said drawings, is placed in a hole drilled through the said knob S S and into the shank A A', so as to enter the slot $e\ e'$ of the shank aforesaid, and being, when in its proper place, as represented by $j\ k\ k$ of the said No. 14. The said slide is also provided with a spiral spring, represented by $h$ of the said No. 10. When pressure is applied to the head G of the said slide, it carries the spring $k\ k$ forward against the shoulders $y$ and $y'$ in the interior of the said escutcheon-tube, whereby they will be closed out of the slots $k'$ and $k'$ and the bolt be left free to move by revolving the said knob S S. When the bolt has reached its limit of motion out or in, respectively, and the pressure has been removed from the said small knob G, the spiral spring $h$ aforesaid will carry back the cylindrical slide to its original position, and the spring $k\ k$ retake its place in the slots $k'\ k'$, thereby holding the bolt in its position in manner and form as aforesaid.

What we claim, and desire to secure by Letters Patent, is—

1. The bolt F when the same is constructed and operated substantially as set forth.

2. The knob S S when the same is constructed and operated substantially as set forth.

3. The annular plate E and the bent wire $b\ b'$ when the same are constructed and operated substantially as set forth, or any other substantially the same.

4. The escutcheon-tube 18 when the same is constructed as aforesaid, combined with the said key No. 12 and the said spring $k\ k$, and otherwise, substantially as set forth.

5. The said key No. 12 when the same is constructed and operated in manner and form as aforesaid, or any other substantially the same.

6. The said cylindrical slide No. 10, with its springs $h$ and $k\ k$, when the same are constructed and operated substantially as set forth.

7. The shank A A' of the said knob S S when the same is constructed and applied substantially as set forth.

8. The said file faced tumbler $l\ l'$ when the the same is constructed and operated substantially as set forth.

9. The slot $z\ z$ of the said escutcheon-tube when constructed and applied substantially as set forth.

10. The lock, as a whole, when the same is constructed and operated substantially as set forth, or any other substantially the same.

E. OTIS FRINK,
CURRAN E. McDONALD.

Attest:
MERIT WELLS,
ALEXANDER WELLS.